US012201029B2

(12) United States Patent
Buchanan et al.

(10) Patent No.: US 12,201,029 B2
(45) Date of Patent: Jan. 14, 2025

(54) SPIN MEMORY ENCRYPTION

(71) Applicants: Colorado State University Research Foundation, Fort Collins, CO (US); Bryn Mawr College, Bryn Mawr, PA (US)

(72) Inventors: Kristen Buchanan, Bellvue, CO (US); Xiao Wang, Homer Glen, IL (US); Xuemei Cheng, Wynnewood, PA (US)

(73) Assignees: Colorado State University Research Foundation, Fort Collins, CO (US); Bryn Mawr College, Bryn Mawr, PA (US)

( * ) Notice: Subject to any disclaimer, the term of this patent is extended or adjusted under 35 U.S.C. 154(b) by 410 days.

(21) Appl. No.: 17/579,048

(22) Filed: Jan. 19, 2022

(65) Prior Publication Data

US 2022/0230669 A1  Jul. 21, 2022

Related U.S. Application Data

(60) Provisional application No. 63/138,986, filed on Jan. 19, 2021.

(51) Int. Cl.
*H10N 50/10* (2023.01)
*G11C 11/16* (2006.01)
(Continued)

(52) U.S. Cl.
CPC .......... *H10N 50/10* (2023.02); *G11C 11/161* (2013.01); *H01F 10/3222* (2013.01); *H01F 10/3268* (2013.01); *H01F 10/3286* (2013.01); *H10N 50/80* (2023.02); *H10N 50/85* (2023.02); *H10B 61/00* (2023.02)

(58) Field of Classification Search
CPC ........ H10N 50/85; H10N 50/80; H10N 52/00; H10N 50/01; H10N 50/10; G11C 11/1675; G11C 11/161; H10B 61/00; H01F 10/3286; H01F 41/32; H01F 10/123; H01F 10/32
See application file for complete search history.

(56) References Cited

U.S. PATENT DOCUMENTS

2019/0074044 A1* 3/2019 Atulasimha ......... G11C 11/5607
2020/0006628 A1* 1/2020 O'Brien .............. H01F 10/3272

OTHER PUBLICATIONS

Fert, A., Cros, V. & Sampaio, J. Skyrmions on the track. Nature Nanotechnology vol. 8 152-156 (2013).
(Continued)

*Primary Examiner* — Ajay Ojha
(74) *Attorney, Agent, or Firm* — Meunier Carlin & Curfman LLC

(57) ABSTRACT

A topological spin memory effect, defined as the recovery of magnetic skyrmions or magnetic bubble skyrmions in magnetic thin films after a transition to a dramatically different spin texture, is used for encrypted non-volatile information storage. The storage strategy is based on magnetic skyrmions, that is, topologically protected spin textures comprising chiral domain walls surrounding small (e.g., nanometers to microns in diameter), typically circular, single-domain cores. Systems and methods are described for encrypted non-volatile information storage based on a spin memory effect in magnetic thin films that support skyrmions. Systems and methods encrypt and recover information stored in the form of magnetic skyrmions.

12 Claims, 11 Drawing Sheets

(51) Int. Cl.
    *H01F 10/32*         (2006.01)
    *H10N 50/80*        (2023.01)
    *H10N 50/85*        (2023.01)
    *H10B 61/00*        (2023.01)

(56) References Cited

OTHER PUBLICATIONS

Zhang, X., Zhou, Y., Song, K. M., Park, T. E., Xia, J., Ezawa, M., Liu, X., Zhao, W., Zhao, G. & Woo, S. Skyrmion-electronics: Writing, deleting, reading and processing magnetic skyrmions toward spintronic applications. Journal of Physics Condensed Matter 32, 143001 (Jan. 6, 2020).

Maccariello, D., Legrand, W., Reyren, N., Garcia, K., Bouzehouane, K., Collin, S., Cros, V. & Fert, A. Electrical detection of single magnetic skyrmions in metallic multilayers at room temperature. Nat. Nanotechnol. 13, 233-237 (2018).

Kasai, S., Sugimoto, S., Nakatani, Y., Ishikawa, R. & Takahashi, Y. K. Voltage-controlled magnetic skyrmions in magnetic tunnel junctions. Applied Physics Express 12, (2019).

\* cited by examiner

300

High Temperatures 610    Lower Temperatures 620    Lowest Temperatures 630

900

SPIN MEMORY ENCRYPTION

CROSS-REFERENCE TO RELATED APPLICATIONS

This application claims the benefit of U.S. provisional patent application No. 63/138,986, filed on Jan. 19, 2021, and entitled "SPIN MEMORY ENCRYPTION," the disclosure of which is expressly incorporated herein by reference in its entirety.

STATEMENT OF GOVERNMENT SUPPORT

This invention was made with government support under grant numbers 1709525 and 1708790, both awarded by the National Science Foundation. The US government has certain rights in the invention.

FIELD

The disclosure generally relates to systems and methods for encrypted non-volatile information storage.

BACKGROUND

Magnetic skyrmions are small swirling magnetic quasi-particles with topological protection. Skyrmions may be observed in thin films with large Dzyaloshinskii-Moriya interactions DMIs and perpendicular anisotropy. They have unique spin textures with a well-defined topological charges of +/−1. Because of the skyrmion topology, transforming from a skyrmion to a uniform magnetic state, i.e., erasing the skyrmions, is difficult. Due to this inherent stability, skyrmions are promising candidates for data-storage solutions and other computing devices.

Skyrmion-based data-storage and logic applications usually require one or more of the following operations: creating/generating skyrmion, moving a skyrmion, switching, detecting a skyrmion, and erasing a skyrmion. Systems and methods for above procedures have been described. Methods to encrypt and decrypt information are also of great interest generally and would be a desirable attribute of skyrmion-based storage and logic devices. Systems, mechanisms, and methods for encryption have not been described for skyrmions.

It is with respect to these and other considerations that the various aspects and embodiments of the present disclosure are presented.

SUMMARY

Provided and described herein are systems and methods for encryption of information based on a topological spin memory effect in magnetic thin films. The topological spin memory effect is defined as the recovery of magnetic skyrmions or magnetic bubble skyrmions after a transition to a dramatically different spin texture (i.e., the spin texture is altered to the extent that it is no longer recognizable as the original). Systems and methods are described for encrypted non-volatile information storage based on a topological spin memory effect in magnetic thin films that support skyrmions. Systems and methods are described to encrypt and recover information stored in the form of magnetic skyrmions.

In an implementation, a method comprises: storing data in a plurality of skyrmions; and encrypting the data by activating a control parameter to enable a spin reorientation or to distort the plurality of skyrmions.

In an implementation, a system comprises: a multilayer film comprising a plurality of skyrmions that store data, wherein the multilayer film is configured to encrypt the data responsive to activating a control parameter; and a substrate on which the multilayer film is disposed.

In an implementation, a multilayer film comprises: a control layer; and a skyrmion layer comprising a plurality of skyrmions that store data that is configurable to be encrypted and decrypted responsive to the control layer being affected by a control parameter.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
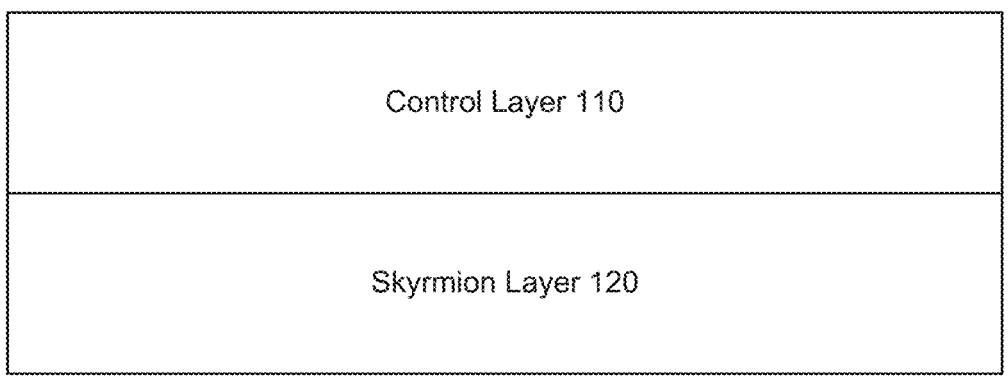
FIG. 1 is a side view illustration of an implementation of a system for providing encryption. In this figure the term 'layer' may refer to one layer or a multiple layers that together perform the intended function.

This description provides examples not intended to limit the scope of the appended claims. The description is not to be taken in a limiting sense but is made merely for the purpose of illustrating the general principles of the invention, since the scope of the invention is best defined by the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Various inventive features are described herein that can each be used independently of one another or in combination with other features.

As described further herein, a topological spin memory effect is used for encrypted non-volatile information storage. The storage strategy is based on magnetic skyrmions, that is, topologically protected spin textures comprising chiral domain walls surrounding small (e.g., nanometers to microns in diameter), typically circular, single-domain cores. The size of the core can be as large as several microns or smaller, even zero.

As described further herein, the systems and methods include not just single or ferromagnetically (FM)-coupled skyrmions, but they also apply to antiferromagnetically (AFM)-coupled skyrmions that may offer potential advantages for spintronic devices, for example, the elimination of the skyrmion Hall effect and large current-driven velocities. Here a topological spin memory effect is demonstrated for AFM-coupled skyrmions and this effect can be used to encrypt and recover information. AFM-coupled bubble skyrmion pairs that are stable at room temperature have been created in sputtered $[Co/Gd/Pt]_{10}$ multilayered thin films. The used multilayered thin film undergoes a spin reorientation transition from out-of-plane at room temperature to in-plane below the spin reorientation transition (SRT) temperature $T_{SRT}$ of the multilayer. Temperature-dependent photoemission electron microscopy (PEEM) imaging shows that these bubble skyrmions evolve into complex in-plane spin textures as the temperature is lowered below $T_{SRT}$. The original skyrmions are no longer identifiable at temperatures below $T_{SRT}$ but the information is still preserved. This is the encrypted state. Due to their distinct real-space topology, the skyrmions can be recovered completely when the temperature is increased back to above the $T_{SRT}$. Micromagnetic simulations demonstrate that Dzyaloshinskii Moriya interactions (DMIs) play a key role in the observed topological spin memory effect.

FIG. 1 is a side view illustration of an implementation of a system 100 for providing encryption. The information is written in magnetic layers in the form of skyrmions. As shown, the system 100 comprises a control layer 110 and a skyrmion layer 120. The control layer 110 may be a magnetic or non-magnetic layer depending on the mechanism of control, for example, in $[Co/Gd/Pt]_{10}$ multilayers, the Gd layer is a magnetic control layer, but the encryption could also be realized using, but not limited to, the application of strain or a voltage in which case a piezoelectric and/or metallic layer would be used for the control layer(s). The skyrmion layer 120 is a magnetic layer or multilayer thin film that consists of magnetic and non-magnetic layers that support skyrmions in the decrypted state.

The skyrmion layer 120 supports magnetic skyrmions in the decrypted state, and the control layer 110 is used to change the state of the system 100 from the decrypted to the encrypted state or vice versal. In some implementations, the two layers 110, 120 are magnetic and are exchange coupled via direct or indirect exchange across a non-magnetic spacer layer (not shown). The implementation described with respect to FIG. 1 involves a spin reorientation transition, a change in magnetic anisotropy; however, FIG. 9 for example describes an alternate implementation that does not involve a change in anisotropy.

Thus, as illustrated in FIG. 1, depending on the implementation, the system uses two or more layers that are coupled to one another. Information is stored as skyrmions in the skyrmion layer 120 that has properties tailored to support the formation of magnetic skyrmions: perpendicular magnetic anisotropy (PMA) and strong anisotropic exchange interactions known as DMIs.

The control layer 110 is used to control the encryption and decryption processes, which is achieved by changing the anisotropy of magnetic skyrmion layer 120 from an in-plane anisotropy (the encrypted state) to out-of-plane anisotropy (the decrypted state) and back. The control layer 110 must have tunable anisotropy that can be controlled by an external stimulus of some type. A control mechanism that uses temperature as the control parameter to affect a SRT is demonstrated, however, the described implementation can be controlled using other external stimuli including but not limited to strain and voltage. The skyrmion/control layered unit (as shown as the system 100 in FIG. 1) may be repeated several times to improve the stability of the skyrmions.

Figure 2A:
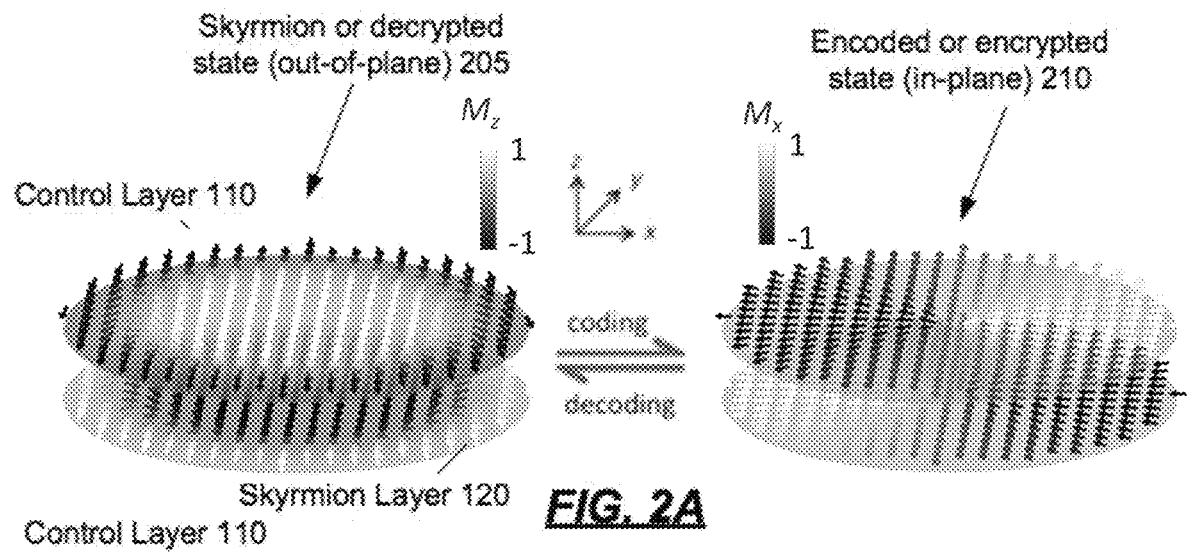
FIG. 2A is an illustration useful for describing an implementation of a system for encryption for antiferromagnetic exchange coupling between a control layer and a skyrmion layer.
Figure 2B:
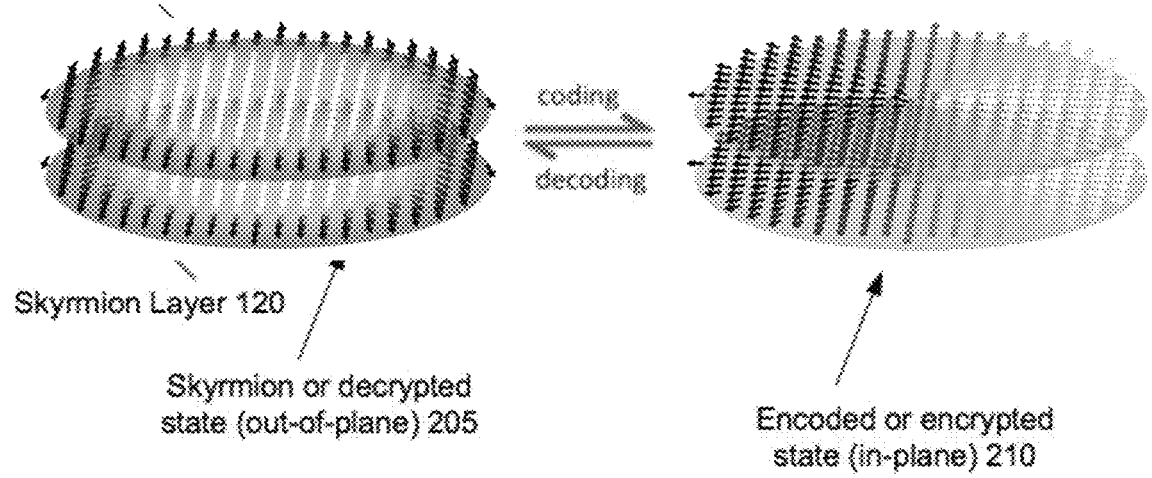
FIG. 2B is an illustration useful for describing an implementation of a system for encryption for ferromagnetic exchange coupling between a control layer and a skyrmion layer.

FIG. 2A is an illustration useful for describing a specific implementation of a system for encryption that involves a magnetic control layer 110 that is coupled antiferromagnetically to the skyrmion layer 120. FIG. 2B is an illustration useful for describing an implementation of a system for encryption that involves a magnetic control layer 110 that is ferromagnetically coupled to a skyrmion layer 120. In the implementations illustrated in FIGS. 2A and 2B, the effective anisotropy of the control layer 110 and hence the state of the control layer 110 is controlled by an external stimulus, for example, by varying the temperature.

An example of the encryption technique is illustrated in FIGS. 2A and 2B for antiferromagnetic and ferromagnetic coupling, respectively, between the control layers 110 and the skyrmion layers 120. In both cases, the control layer 110 is used to change the anisotropy of the coupled films from an in-plane anisotropy to an out-of-plane anisotropy and back. Skyrmions, used to store and read information, are supported when the anisotropy is out-of-plane, i.e., when the thin film stack is in the "skyrmion" state 205. In the in-plane state 210, the skyrmions are replaced by complex in-plane spin states that involve a radial vortex or a network of radial vortices and antivortices inside of the skyrmion core, and networks of radial vortices and antivortices outside of the skyrmion core. This is the "encoded" state. The topological spin memory effect enables storage and retrieval of information as described herein.

In the decrypted or "skyrmion" state 205, coupled skyrmions that are used to store the information are supported. The net anisotropy is in the out-of-plane direction in the decrypted state, which is needed to support the magnetic skyrmions. By tuning the magnetization and/or the anisotropy of the control layer 110 through changing a control parameter (e.g., temperature), the areas with spins perpendicular to the multilayer film plane in the decrypted state 205 will go through a spin reorientation transition and change to the in-plane (multi-domain) state(s) 210. The transformation is dramatic, i.e., the original skyrmion is not recognizable, and the information is hence encrypted. The chiral nature of the domain walls of the original skyrmions in the decrypted state 205 enables this encryption strategy. Because the domain walls are chiral and the spin state is topologically protected, the memory of the chirality of these domain walls is preserved during the encryption process. The skyrmions and their carried information will be recovered when the control parameter is changed back to that for the decrypted state 205.

Figure 3:
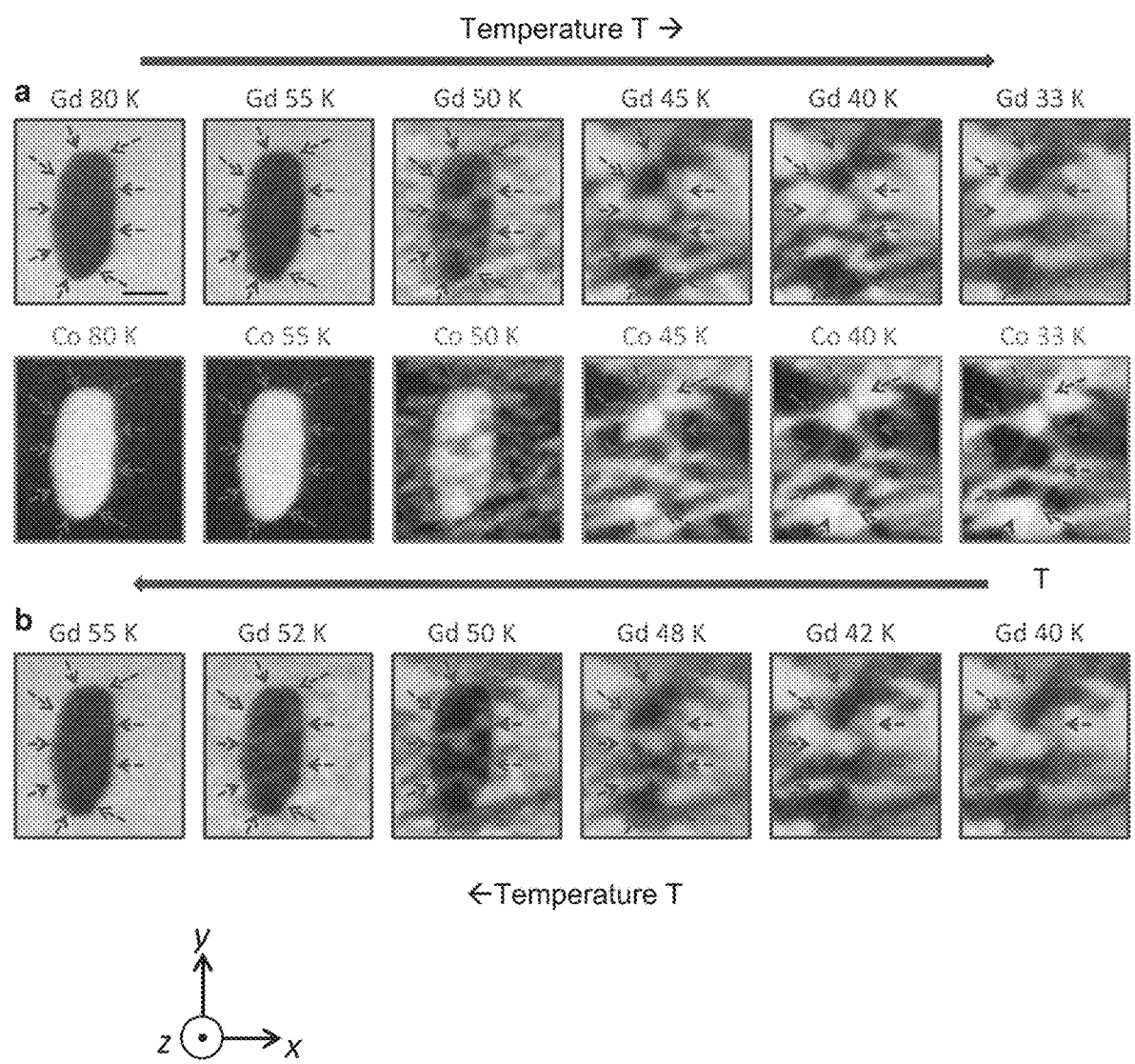
FIG. 3 is an illustration of experimental data showing how a bubble skyrmion can be obscured and then recovered when the thin film stack that supports the skyrmion is cycled through a spin reorientation transition, in this case by changing the temperature.

FIG. 3 is an illustration of experimental data 300 showing how a bubble skyrmion can be obscured and then recovered when the thin film that supports the skyrmion is cycled through a spin reorientation transition, in this case by changing the temperature. PEEM images of one region of the sample that has a single bubble skyrmion for $T > T_{SRT}$ are shown at representative temperatures as the sample is (a) cooled down from room temperature 80 K to 33 K and (b) subsequently warmed back up (images shown from 40 K to 55 K). Images taken at the Gd $M_5$ edge (from a multilayer structure described further herein) are shown for various temperatures and the corresponding images taken at the Co $L_3$ edge are also shown for the cooling cycle. The x-rays travel from right to left at an angle of 30 degrees with respect to the film plane. This information along with additional x-ray circular magnetic dichroism and magnetometry measurements allow for the assignment of directions to the magnetization. At the higher temperatures, the spin configuration is that of a bubble skyrmion and the dark/light contrast shows the out-of-plane component of the magnetization, whereas at the lowest temperatures the spins are primarily in-plane and the patchwork contrast is representative of the x-component of the magnetization.

More particularly, FIG. 3 shows experimental evidence of the topological spin memory effect. The PEEM images of the spin distributions in a Gd/Co/Pt multilayer film with 10 repeats of the Gd/Co/Pt unit are shown as the temperature is first reduced and then increased. Coupled bubble skyrmion pairs in the Co and Gd layers that are observed at high temperatures begin to fade as the temperature is reduced. Although the bubble skyrmions have evolved into complex in-plane spin distributions at temperatures below the SRT temperature, the skyrmions reform in the same positions and with the same shape when the temperature is increased above the SRT temperature again. In this example, the Gd layer plays the role of a control layer, and the Co layer is the skyrmion layer where the Co/Pt interface provides the PMA and DMIs that are needed to support the skyrmions. The Co and Gd are coupled through direct exchange coupling, which in this case leads to antiferromagnetic coupling of the two layers (illustrated in FIG. 2A). The magnetic moment of the control (Gd) layer is strongly temperature dependent and at low temperatures the Gd moment becomes large enough that the Gd shape anisotropy overcomes the PMA in the Co film and leads to a spin reorientation transition to an in-plane spin configuration at low temperatures.

Figure 4:
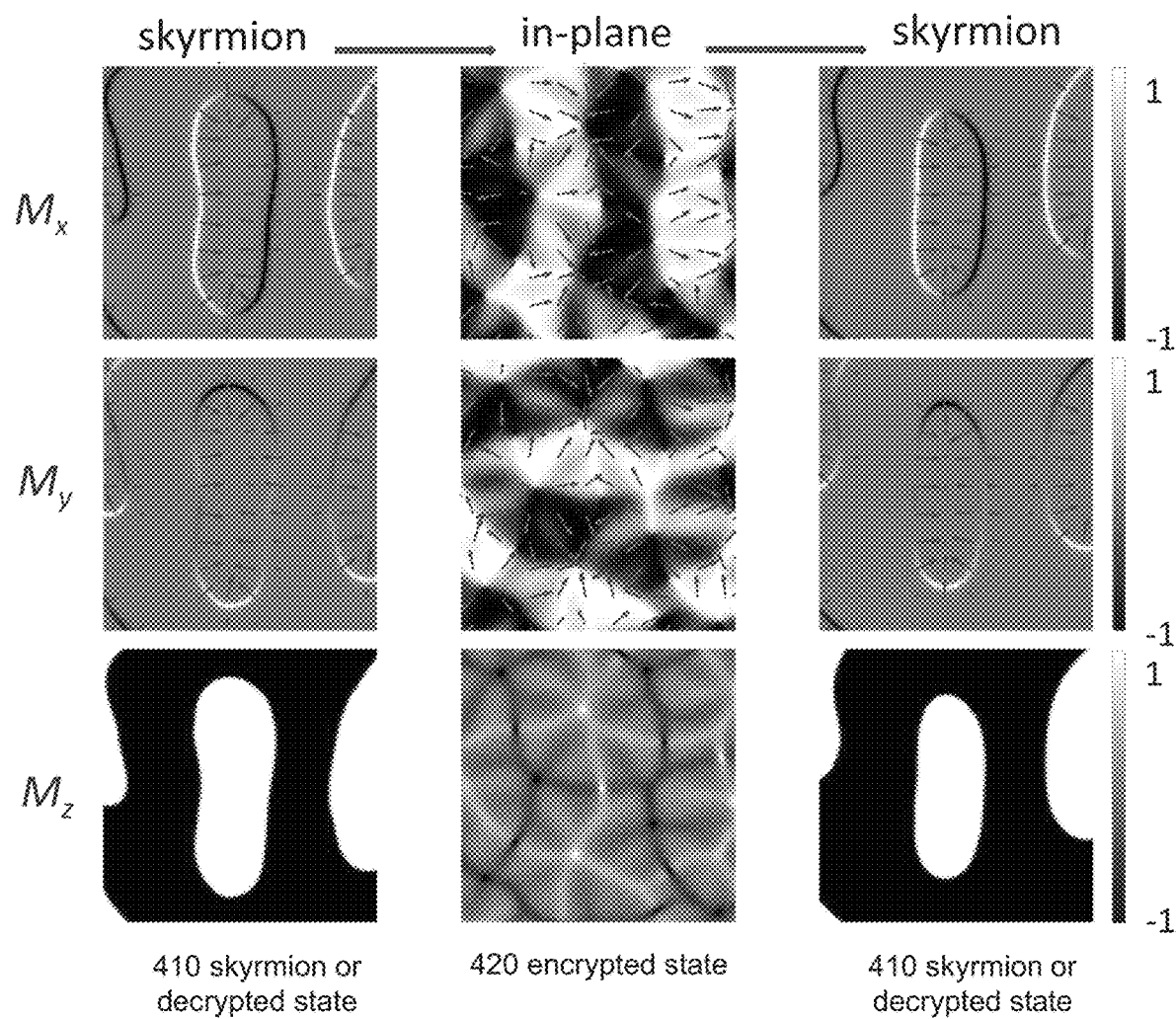
FIG. 4 is an illustration of micromagnetic simulations of the evolution of the spin state of the skyrmion layer when the control parameter, in this case the temperature, is chosen to set first the skyrmion (decrypted) state, then the encrypted state (in-plane, in this case), followed by recovery of the original skyrmion (recovered) state.

Micromagnetic simulations, such as those shown in FIG. 4, reproduce the observed effect and show that the DMIs play an important role in the observed topological spin memory. In the in-plane state, the skyrmions are replaced by complex in-plane spin states that involve radial vortices and antivortices. The topological charge of the skyrmion is conserved through the spin reorientation. Furthermore, the spin directions at the location of the original skyrmion domain wall remain roughly but not exactly the same. Because the original skyrmion domain wall chirality is favored by the DMI, the skyrmion reforms in almost the same location with almost the same shape when the control parameter, in this case the temperature, is set to return the system to the decrypted/skyrmion state. The skyrmions are recovered even if the in-plane spin distribution is complex.

FIG. 4 is an illustration of micromagnetic simulations 400 of the evolution of the spin state of the skyrmion layer in response to a change of the control parameter to the in-plane state followed by a return to the skyrmion state.

Micromagnetic simulations of the evolution of the spin state of the Co thin films, are provided in this example where the control layer is Gd and the control parameter is temperature. The white and black regions in the top, middle, and bottom rows of images correspond to the magnitude of the x-, y-, and z-components of the magnetization, respectively, and the superimposed arrows show the local in-plane orientations of the magnetization. The Gd control layer is exchange coupled to the Co layer and the spin distributions in the Gd layer are identical to those of the Co layer except the contrast of all components is opposite to that of the Co layer since the layers are AFM coupled. The simulations use a DMI value of 2.5 mJ/m$^2$ assigned to the Co layer. The relaxed spin states are shown at 160 K, then after lowering the temperature to below $T_{SRT}$, and finally upon returning the temperature to 160 K. The skyrmions observed initially at 160 K are replaced by a complex in-plane spin distribution below $T_{SRT}$, then reform in the original locations with very similar shapes when the temperature is returned to 160 K. The key parameter that changes with temperature is the overall anisotropy of the thin film system, in this case the sum of the shape and interfacial anisotropies, where the net anisotropy is out-of-plane at 160 K and in-plane below $T_{SRT}$.

FIG. 4 shows skyrmion or decrypted state 410 and encrypted state 420 as temperature changes, along with the spin memory effect. It has been observed that with no DMI, the spin state after temperature cycling does not match the original 170 K spin state. With DMI, the skyrmions are recovered after temperature cycling.

The chirality of the skyrmion domain wall is preserved as T is reduced across the SRT. The chirality, in turn, facilitates the re-formation of the skyrmion on re-warming due to the DMI. In some implementations, it has been determined that for the case of DMI=2.5 mJ/m$^2$, the bubble skyrmions are recovered. It has also been determined that in the absence of DMI, the bubble skyrmions may not be recovered.

In some implementations, the tuning parameter for the Gd/Co/Pt multilayers that allows for external control of the spin reorientation transition is temperature. The effect is, however, more general. Other material combinations that lead to a spin reorientation with temperature are possible, hence the transition temperature can be tuned to a desired device operation temperature range. Furthermore, other methods of tuning the anisotropy are possible including current control, magnetic voltage-controlled anisotropy, voltage- or temperature-controlled strain to switch the anisotropy, for example. These strategies for controlling the encryption/decryption process are more useful for devices because they will enable room temperature device operation.

Detection of the information is an important aspect of any device, including skyrmion-based memories. Research on magnetic skyrmions is often done using direct imaging techniques, similar to the PEEM images shown in FIG. 3, but for skyrmion-based devices, electrical detection schemes based on magneto-transport measurements are more practical and may be the preferred readout strategy. Schemes based on Hall resistance measurements and magnetic tunnel junction (MTJ) devices have been proposed and demonstrated. Hall resistivity measurements are of particular interest because they are straightforward to include in a racetrack geometry that has been proposed as the basis for skyrmion devices. Hall resistance measurements are made using a small in-plane current while a transverse, also in-plane, voltage is measured; the skyrmion signal is from a combination of the anomalous Hall effect and the topological effect. In a MTJ device, the signal is due to a spin-dependent tunneling voltage. The electrical signals detected in the encrypted state depend on device design, but devices that are optimized for skyrmion detection (the decrypted state), and the corresponding in-plane encrypted states have vastly different electrical signatures that are difficult to discern.

Figure 5:
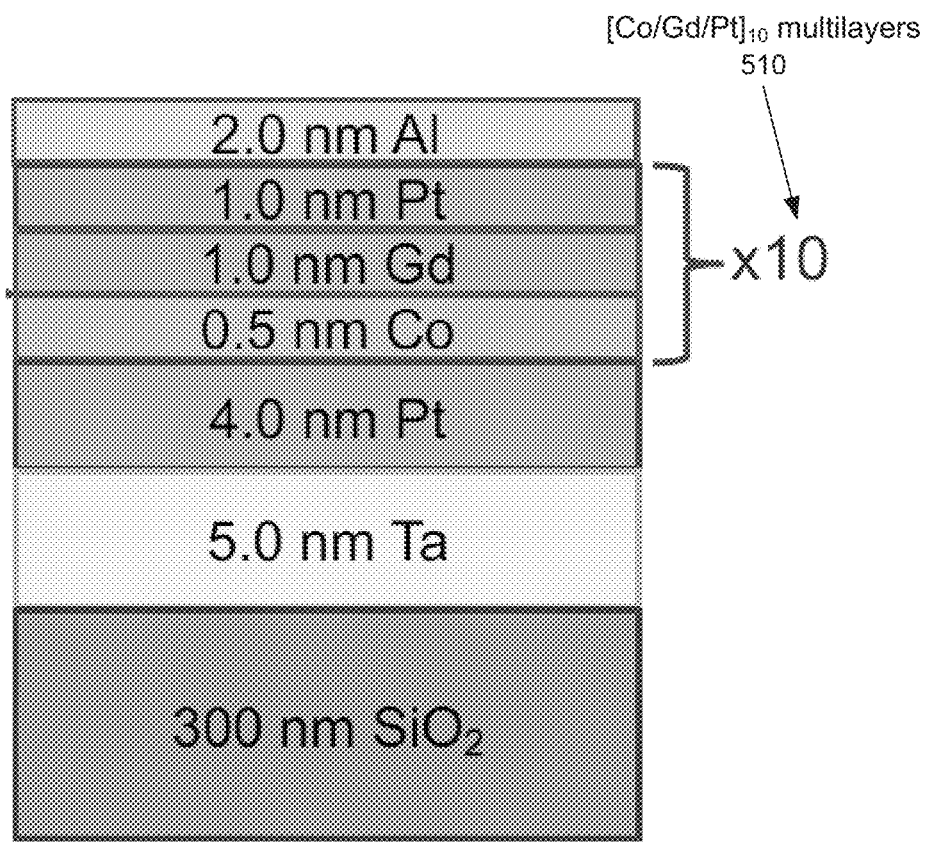
FIG. 5 is a diagram of one example of the films in an implementation of a multilayered film that comprises control layers (Gd) and skyrmion layers (Co/Pt) that support skyrmions.

FIG. 5 is a diagram of the films in an implementation of a multilayered film 500 that includes both control layers and skyrmion layers, in this case AFM-coupled skyrmion pairs. As shown, the multilayered film 500 comprises [Co/Gd/Pt]$_{10}$ multilayers 510. In an implementation, each Pt and Gd layer is 1.0 nm thick and each Co layer is 0.5 nm thick. As shown, a 2.0 nm Al layer covers the [Co/Gd/Pt]$_{10}$ multilayers 510, and the [Co/Gd/Pt]$_{10}$ multilayers 510 are disposed on a 4.0 nm PT layer over a 5.0 nm Ta layer and a 300 nm SiO$_2$ substrate. The [Co/Gd/Pt]$_{10}$ multilayers 510 support skyrmions and comprise multilayered materials with interfacial DMI. AFM coupling exists between the Co/Gd layers, along with perpendicular anisotropy and large DMI at the Co/Pt interface. This results in stable skyrmions at room temperature.

In an implementation, Ta (5 nm)/Pt (4 nm)/[Co (0.5 nm)/Gd (1 nm)/Pt (1 nm)]10/Al (2 nm) multilayers, illustrated in FIG. 5 and referred to as [Co/Gd/Pt]$_{10}$, were deposited onto a Si substrate with a 300-nm-thick thermally oxidized SiO$_2$ top layer by DC magnetron sputtering. The base pressure was $5 \times 10^{-8}$ Torr. The deposition pressure was 5 mTorr with the Ar gas flow rate of 30 SCCM. The deposition rates for Ta, Pt, Co, Gd, and Al were 0.4, 0.5, 0.2, 0.2 and 0.4 Å/s respectively.

A topological spin memory effect in [Co/Gd/Pt]$_{10}$ multilayers is described. The magnetic properties of the [Co/Gd/Pt]$_{10}$ multilayers are ideally suited for stabilizing AFM-coupled skyrmions. The antiferromagnetic coupling between the Gd and Co layers leads to the formation of bubble skyrmions that are stabilized in the Co layer and mirrored in the Gd layer. The antiferromagnetic coupling between the Co and Gd, combined with the perpendicular anisotropy and interfacial DMI that arise predominantly at the Co/Pt interface, leads not only to the formation of AFM-coupled bubble skyrmion pairs that are stable at room temperature, but also to a topological spin memory effect. The skyrmions are recovered when the temperature is cycled below and then back above a spin reorientation transition (SRT) temperature T$_{SRT}$, despite the fact that the SRT leads to a dramatic rearrangement of the spin texture from bubble skyrmions to collections of radial vortices and antivortices. A comparison of the experimental PEEM images with micromagnetic simulations indicates that the domain wall chirality of the bubble skyrmions is encoded in the in-plane spin distributions below T$_{SRT}$, and that this encoding, because of the presence of DMI, leads to the reformation of bubble skyrmions with remarkably similar shapes, sizes, and locations when the temperature is raised back above T$_{SRT}$.

Regarding an AFM-coupled bubble skyrmion pair in [Co/Gd/Pt]$_{10}$ multilayers, each layer contains a bubble skyrmion with the spins pointing out-of-plane in the core area and a Néel-type chiral domain wall boundary. The spins in the two layers are in opposite directions. To realize this spin configuration experimentally, multilayers of [Co (0.5 nm)/Gd (1 nm)/Pt (1 nm)]$_{10}$ with a Ta (4 nm)/Pt (5 nm) buffer layer and a Al (2 nm) capping layer were sputter deposited onto an oxidized silicon substrate. In this implementation, stable magnetic skyrmions are expected at room temperature due to the broken symmetry and large spin orbit coupling in the Pt that leads to large DMI at the Pt/Co interfaces as well as perpendicular magnetic anisotropy from the Pt/Co interfaces. The additional antiferromagnetic exchange coupling between the Co and Gd layers favors AFM-coupled skyrmion pairs in [Co/Gd/Pt]$_{10}$ multilayers at room temperature.

Figure 6:
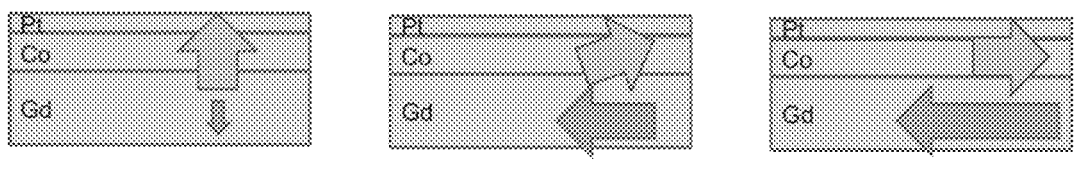
FIG. 6 is a diagram that is useful to describe how films in a multilayered film undergo a spin reorientation transition from perpendicular magnetic anisotropy to in-plane anisotropy.

FIG. 6 is a diagram that is useful to describe a multilayered film such as the [Co/Gd/Pt]$_{10}$ films undergo a spin reorientation transition. The Co and Gd are antiferromagnetically coupled. The Co/Pt interface provides perpendicular magnetic anisotropy. A spin reorientation transition occurs as temperature changes. For Co, the moment is relatively constant vs. temperature. For Gd, the moment increases with decreasing temperature, which results in an increase in the Gd shape anisotropy and a change in the net anisotropy (interfacial and shape) of the [Co/Gd/Pt]$_{10}$ film. For the film thicknesses shown in FIG. 5, the spin reorientation begins at approximately 70 K. As shown, the spin orientation changes as the temperature is cooled from high temperatures 610 to lower temperatures 620 to a lowest temperature 630. Then upon warming, a spin reorientation occurs as described further herein.

The magnetic properties of the [Co/Gd/Pt]$_{10}$ film change significantly with temperature T, which, in turn, leads to modifications of the spin configurations. To investigate the evolution of the spin textures, XMCD-PEEM imaging was conducted while cooling the [Co/Gd/Pt]$_{10}$ film from room temperature down to 33 K and warming it back up. In this experimental example, on cooling down from room temperature, the bubble skyrmions remain the same from room temperature to 70 K. The bubble skyrmions begin to fade as T is further decreased to 55 K, 50 K, and 48 K, and the bubble skyrmions are no longer visible at 45 K. The spin configuration transitions from well-defined bubble skyrmions to a vastly different multi-domain pattern. When T is increased back up, the bubble skyrmion cores begin to reappear at approximately 48 K and the bubble skyrmions are recovered as T is further increased. The recovered bubble skyrmions at 55K have almost exactly the same locations, sizes, and shapes as the original bubble skyrmions, in spite of the fact that the low temperature domain pattern is completely different than the high temperature patterns.

Figure 7:
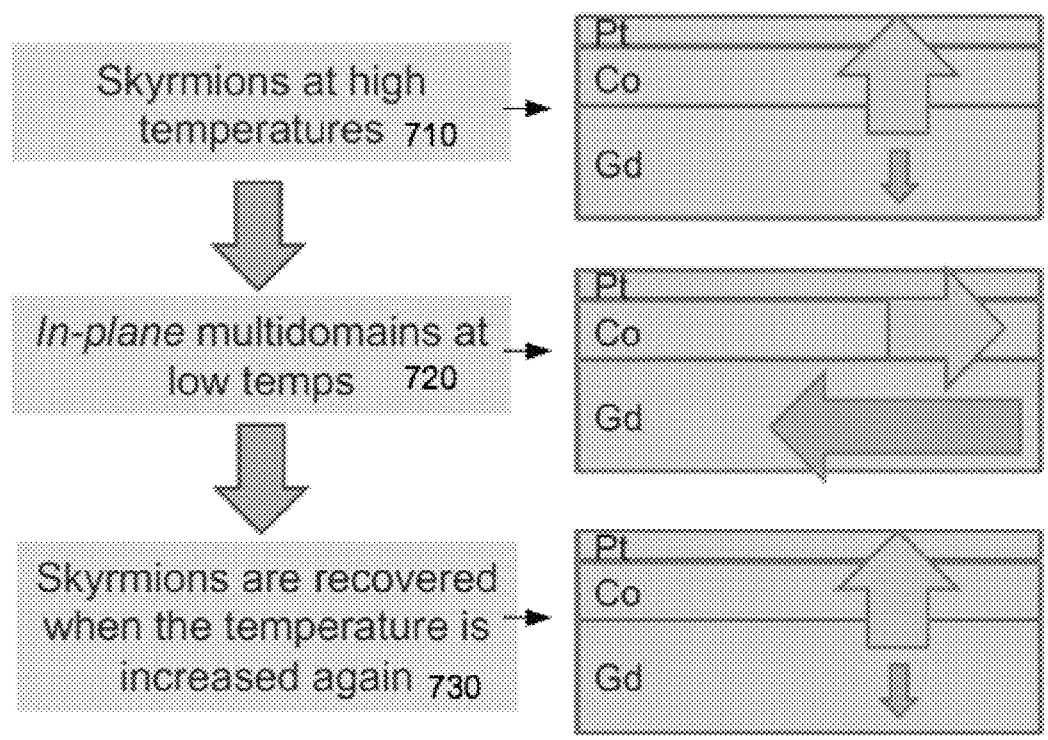
FIG. 7 is a diagram that is useful to describe a topological spin memory effect in a multilayered film.
Figure 7:
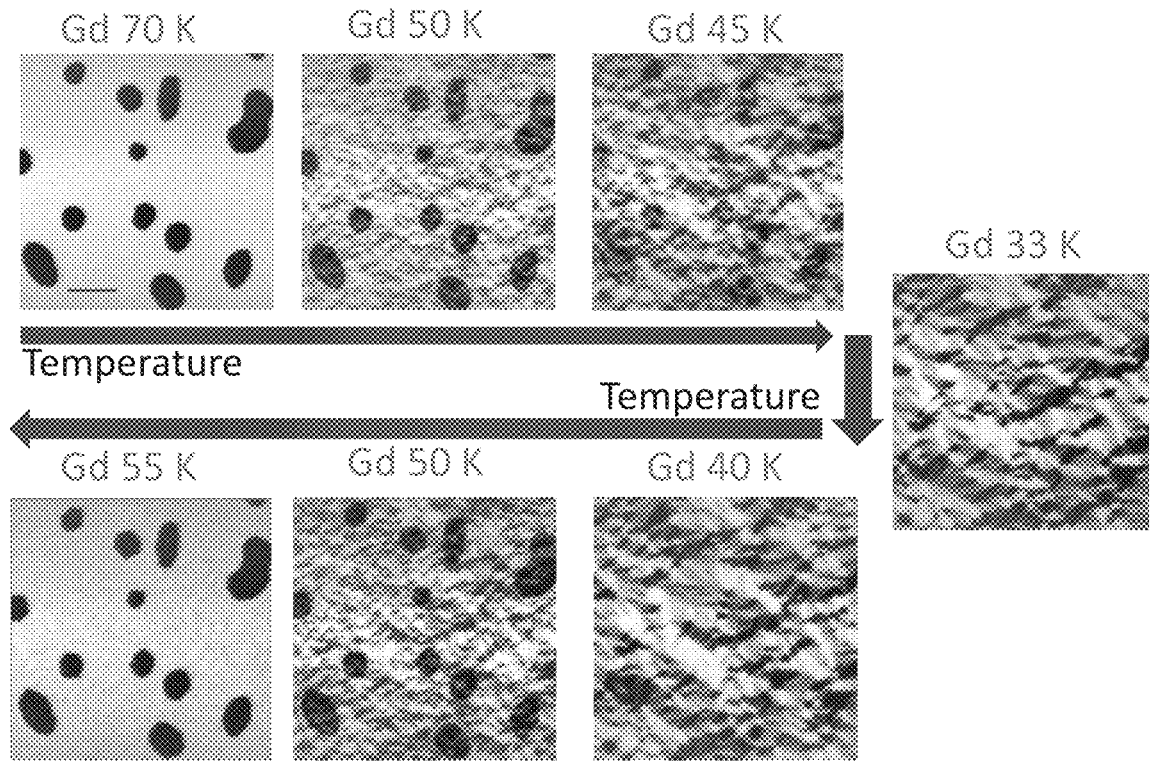

FIG. 7 is a diagram that is useful to describe a topological spin memory effect 750 in a multilayered film. More particularly, FIG. 7 shows that, along with PEEM images of skyrmions in [Co/Gd/Pt]$_{10}$ films, there are out-of-plane skyrmions at high temperatures 710, an in-plane distribution at low temperatures 720, and skyrmion recovery at high temperatures 730.

A topological spin memory effect in [Co/Gd/Pt]$_{10}$ multilayers is described. PEEM images of AFM-coupled bubble skyrmion pairs, taken as the temperature is cycled from room temperature to 33 K and back, show that although the AFM-coupled bubble skyrmions are completely replaced by a complex, predominantly in-plane multidomain state when the sample is cooled below the spin reorientation temperature T$_{SRT}$=70 K, the bubble skyrmions are recovered almost perfectly when the sample is warmed back above $T_{SRT}$. The AFM-coupled Co and Gd skyrmion pairs are stable with no applied magnetic field over a large temperature range from room temperature to $T_{SRT}$. Furthermore, the topological spin memory effect provides a means to encrypt and recover spin information that could serve as the basis for a magnetic analog of invisible ink, and it may also inspire new approaches to controlled skyrmion formation and manipulation for logic applications. There is a high degree of tunability that is possible with AFM-coupled multilayers for skyrmion device applications along with the robustness of the topological protection associated with skyrmion spin textures.

Figure 8:
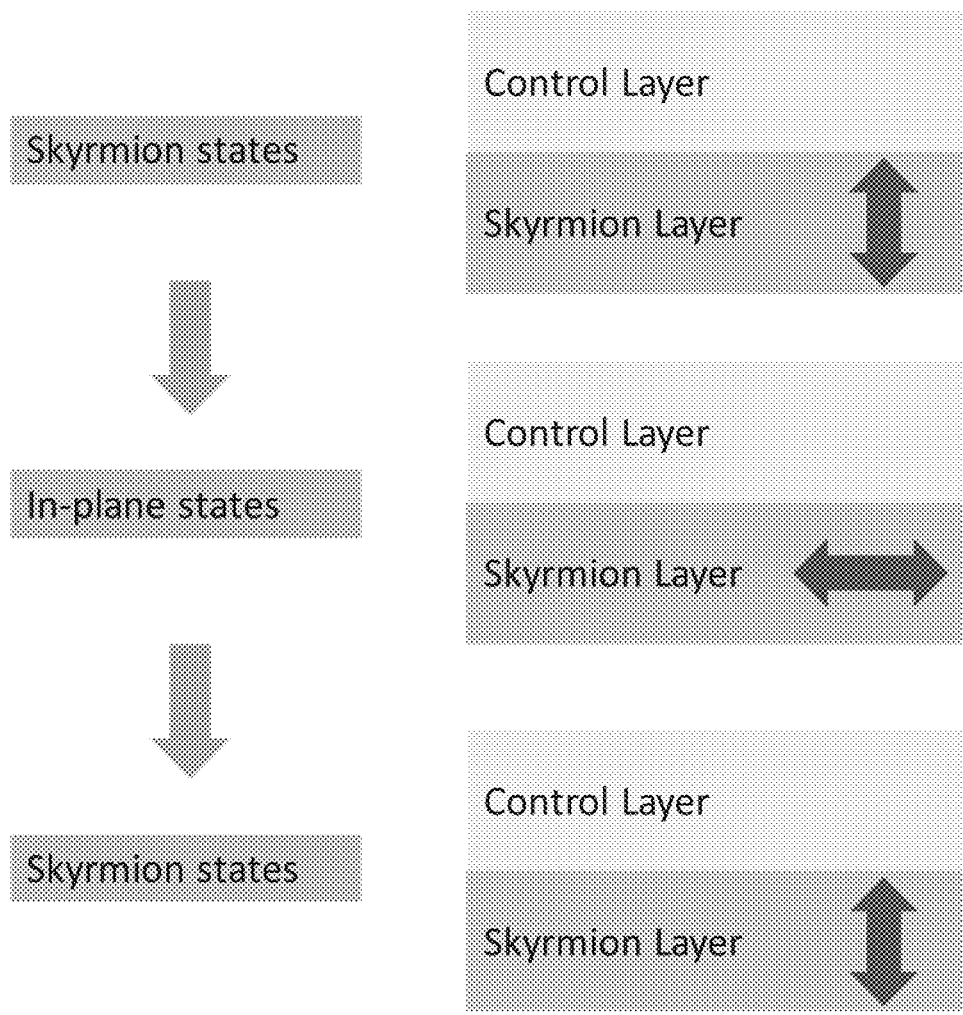
FIG. 8 is a flow diagram of an implementation of skyrmion encryption method where the skyrmions are obscured and recovered.

FIG. 8 shows a flow diagram 800 of the implementation of the skyrmion encryption and recovery where the control layer is used to switch the skyrmion layer from out-of-plane to in-plane anisotropy and back to encrypt and decrypt the information.

Figure 9:
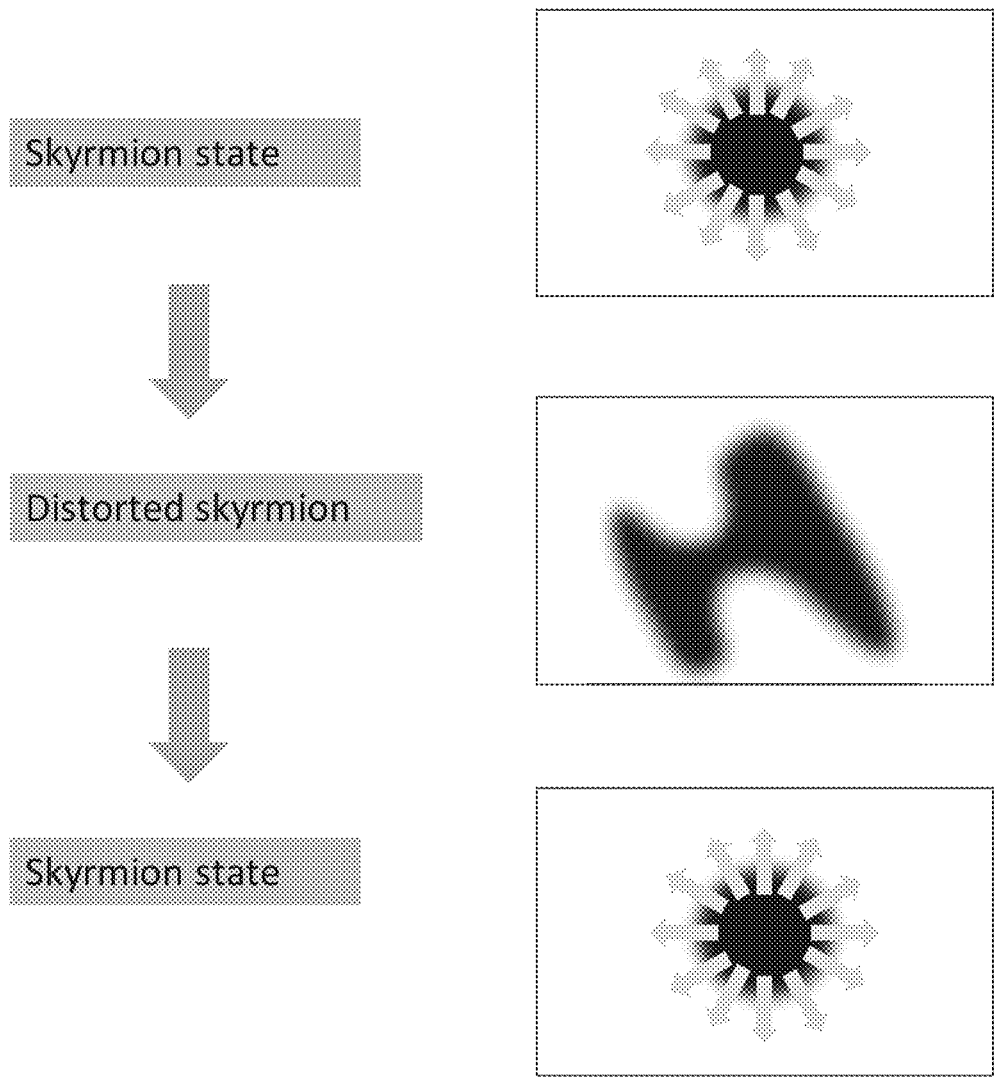
FIG. 9 is a diagram of an additional implementation where the shape of the skyrmion is distorted through the variation of a control parameter.

FIG. 9 shows a diagram 900 of an additional implementation where the shape of the skyrmion is distorted through the variation of a control parameter, e.g., a current, magnetic field, voltage, and/or strain. The topological protection associated with the skyrmion state allows for considerable spin rearrangement that provides a means to obscure without losing the memory of the underlying state. This is the basis for the topological spin memory effect implemented by anisotropy control. FIG. 9 shows an extension of this effect that will work without the need for a change in the anisotropy.

Figure 10:
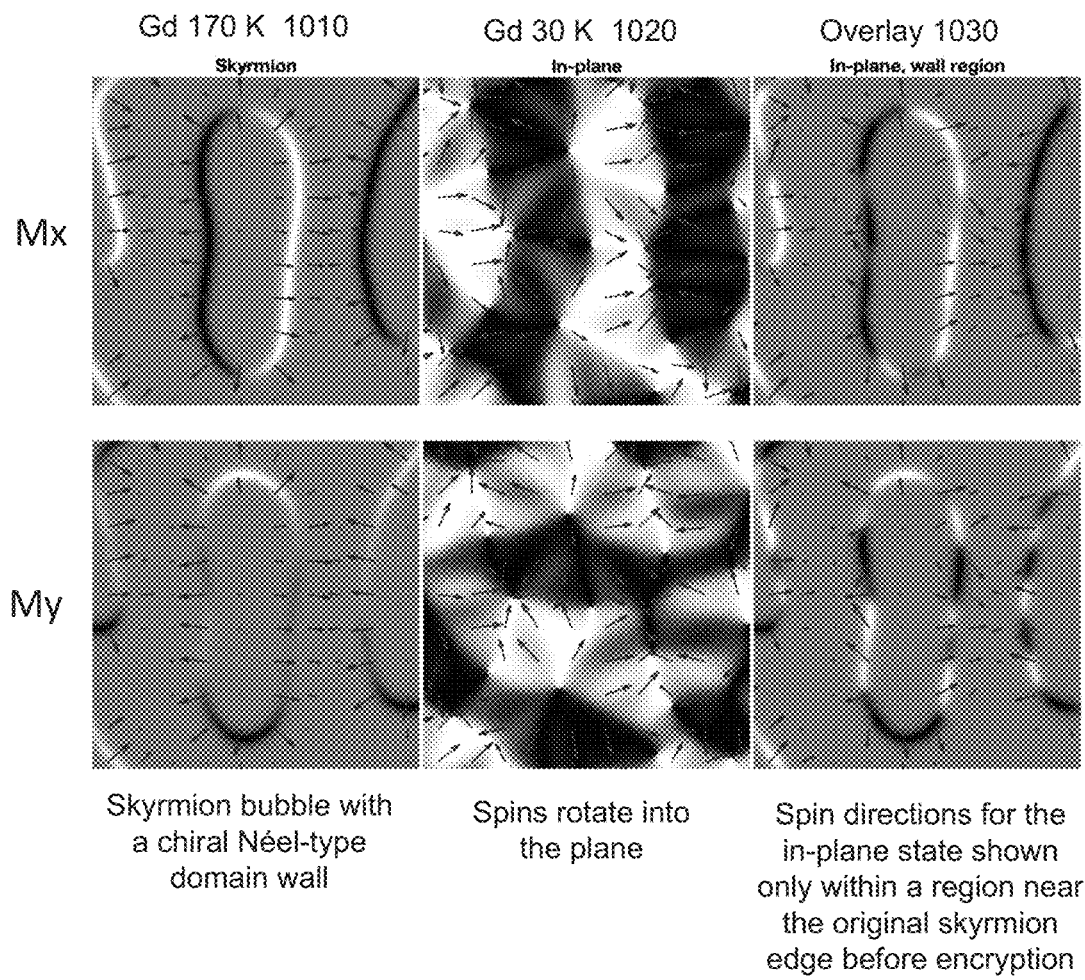
FIG. 10 is a diagram that is useful to describe the mechanism for the topological spin memory effect.
Figure 10:
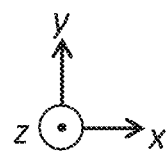

FIG. 10 is a diagram 1000 that is useful to describe micromagnetic simulations of temperature dependence in a multilayered film. FIG. 10 shows the in-plane magnetic components, Mx and My, in the top and bottom rows the original skyrmion state in the left panels and the associated in-plane magnetic state in the middle. The right column shows the in-plane state from the middle panel highlighting a narrow region at the boundary of the original skyrmion. The in-plane state in this region is similar to the in-plane magnetization of the original skyrmion, hence a memory of the original skyrmion is preserved. Because the DMI favors a particular chirality, the skyrmion is recovered.

It has been determined that the spin memory effect, the recovery of the bubble skyrmions when warming up despite the previous transition to a dramatically different in-plane magnetic configuration on cooling down, is mainly due to the interfacial DMI in the $[Co/Gd/Pt]_{10}$ film and the resultant topological protection it offers. As shown, Gd at 170 K 1010 provides a bubble skyrmion with a chiral Néel-type domain wall, and in conjunction with Gd at 30 K 1020 (spins rotate into the plane) results in the overlay 1030 that shows that spin direction at the skyrmion edges are similar to the directions of the spins in the skyrmion wall. More particularly, the overlay 1030 has spin directions for the in-plane state shown only within a region near the original skyrmion edge before encryption.

The Néel domain walls and the bubble skyrmion cores at high temperatures set the directions of the in-plane distributions and the net core polarizations, respectively, of the radial vortices and antivortices in the in-plane magnetic configurations at $T<T_{SRT}$. Because the DMI favors a particular Néel wall chirality, the skyrmions will reform at similar locations and with a similar shape when the sample is warmed back above $T_{SRT}$.

Figure 11:
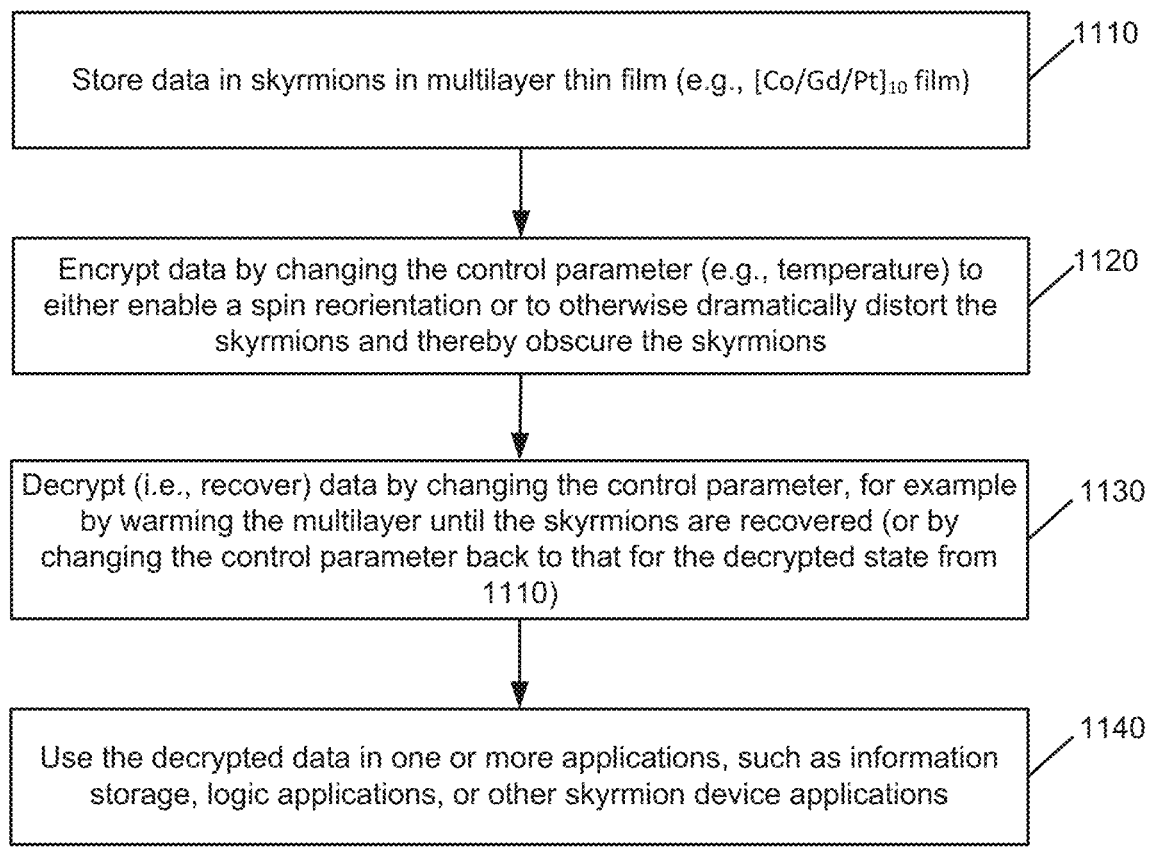
FIG. 11 is an operational flow of an implementation of a method of skyrmion encryption and recovery/decryption.

FIG. 11 is an operational flow of an implementation of a method 1000 of skyrmion obscuring and recovery.

At 1110, data to be encrypted is stored in skyrmions using a control parameter. In some implementations, the data to be encrypted is stored in skyrmions in a multilayer film such as a $[Co/Gd/Pt]_{10}$ film. It is contemplated that other films may be used. In some implementations, the control parameter may be temperature of the multilayer film. In some implementations, the skyrmions may be bubble skyrmions. In some implementations the DMI may be interfacial DMI.

At 1120, the data is encrypted by changing (e.g., activating) the control parameter to encrypt the skyrmions. The data is encrypted by changing the control parameter (e.g., temperature) to either enable a spin reorientation or to otherwise distort the skyrmion to obscure the skyrmion (e.g., the spin texture is altered to the extent that it is no longer recognizable as the original). In some implementations in which the control parameter is temperature, the data may be encrypted by cooling the multilayer to below a certain temperature in which the skyrmions are no longer visible (i.e., are erased).

At 1130, at some point when recover the of encrypted data is sought, the data is decrypted (recovered) by changing the control parameter back to that for the decrypted state from 1011. In some implementations in which the control parameter is temperature, the data may be decrypted by warming the multilayer until the temperature is increased enough to recover the skyrmions (i.e., make them reappear or visible).

At 1140, the decrypted data may be used in one or more applications, such as logic applications or other skyrmion device applications.

Thus, a magnetism-based encryption strategy is provided for non-volatile storage of encrypted information that is based on magnetic skyrmions and leverages the chiral nature of the skyrmion domain walls, and has the potential to operate at room temperature.

In an implementation, a method comprises: storing data in a plurality of skyrmions; and encrypting the data by activating a control parameter to enable a spin reorientation or to distort the plurality of skyrmions.

Implementations may include some or all of the following features. The plurality of skyrmions comprise at least one skyrmion. The plurality of skyrmions are comprised in a multilayer film. The multilayer film comprises a $[Co/Gd/Pt]_{10}$ film. The control parameter is at least one of temperature, strain, voltage, current, or magnetic field. The control parameter is temperature. Activating the control parameter comprises cooling a film in which the plurality of skyrmions are disposed to below a predetermined temperature. The method further comprises decrypting the data by warming the film in which the plurality of skyrmions are disposed above the predetermined temperature. Encrypting the data comprises using the control parameter to obscure the plurality of skyrmions. The method further comprises decrypting the data by using the control parameter to recover the plurality of skyrmions. The method further comprises decrypting the data by using the control parameter to recover the data. The method further comprises using the decrypted data in one more of a logic application or a skyrmion device application.

In an implementation, a system comprises: a multilayer film comprising a plurality of skyrmions that store data, wherein the multilayer film is configured to encrypt the data responsive to activating a control parameter; and a substrate on which the multilayer film is disposed.

Implementations may include some or all of the following features. The plurality of skyrmions comprise bubble skyrmions. The multilayer film comprises a $[Co/Gd/Pt]_{10}$ film. The control parameter is temperature, and wherein activating the control parameter comprises cooling the multilayer film to below a predetermined temperature to erase the plurality of skyrmions, and wherein the multilayer film is configured to decrypt the data by warming the multilayer film above the predetermined temperature. The control parameter is at least one of temperature, strain, voltage, current, or magnetic field. The system further comprises decrypting the data by using the control parameter to recover the data.

In an implementation, a multilayer film comprises: a control layer; and a skyrmion layer comprising a plurality of skyrmions that store data that is configurable to be encrypted and decrypted responsive to the control layer being affected by a control parameter.

Implementations may include some or all of the following features. The control parameter is temperature, and wherein the control parameter is configured to encrypt the data when cooling the skyrmion layer to below a predetermined temperature, and decrypt the data when warming the skyrmion layer to above the predetermined temperature.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   storing data in a plurality of skyrmions; and
   encrypting the data by activating a control parameter to enable a spin reorientation or to distort the plurality of skyrmions.

2. The method of claim 1, wherein the plurality of skyrmions comprise at least one skyrmion.

3. The method of claim 1, wherein the plurality of skyrmions are comprised in a multilayer film.

4. The method of claim 3, wherein the multilayer film comprises a $[Co/Gd/Pt]_{10}$ film.

5. The method of claim 1, wherein the control parameter is at least one of temperature, strain, voltage, current, or magnetic field.

6. The method of claim 1, wherein the control parameter is temperature.

7. The method of claim 6, wherein activating the control parameter comprises cooling a film in which the plurality of skyrmions are disposed to below a predetermined temperature.

8. The method of claim 7, further comprising decrypting the data by warming the film in which the plurality of skyrmions are disposed above the predetermined temperature.

9. The method of claim 1, wherein encrypting the data comprises using the control parameter to obscure the plurality of skyrmions.

10. The method of claim 9, further comprising decrypting the data by using the control parameter to recover the plurality of skyrmions.

11. The method of claim 1, further comprising decrypting the data by using the control parameter to recover the data.

12. The method of claim 11, further comprising using the decrypted data in one more of a logic application or a skyrmion device application.

* * * * *